United States Patent
Wako (10) Patent No.: US 6,983,203 B1
(45) Date of Patent: Jan. 3, 2006

(54) POI ICON DISPLAY METHOD AND NAVIGATION SYSTEM

(75) Inventor: Hikaru Wako, Redondo Beach, CA (US)

(73) Assignee: Alpine Electronics, Inc., Tokyo (JP)

(*) Notice: Subject to any disclaimer, the term of this patent is extended or adjusted under 35 U.S.C. 154(b) by 379 days.

(21) Appl. No.: 09/626,197

(22) Filed: Jul. 28, 2000

(51) Int. Cl.
G06F 19/00 (2006.01)

(52) U.S. Cl. ............... 701/208; 340/988; 340/995; 342/357.13

(58) Field of Classification Search ......... 701/211, 701/207, 208, 209, 204, 210; 340/988, 995, 340/990; 342/357, 457
See application file for complete search history.

(56) References Cited

U.S. PATENT DOCUMENTS

| 4,761,742 A | | 8/1988 | Hanabusa et al. ......... 364/443 |
| 5,470,233 A | * | 11/1995 | Fruchterman et al. ...... 434/112 |
| 5,819,200 A | * | 10/1998 | Tamai et al. ............. 701/208 |
| 5,832,408 A | * | 11/1998 | Tamai et al. ............. 701/208 |
| 5,987,375 A | * | 11/1999 | Tamai ................... 701/200 |
| 6,259,987 B1 | * | 7/2001 | Ceylan et al. ............ 701/200 |
| 6,308,177 B1 | * | 10/2001 | Israni et al. ............. 707/100 |
| 6,374,180 B1 | * | 4/2002 | Slominski et al. ......... 701/208 |
| 6,401,034 B1 | * | 6/2002 | Kaplan et al. ............ 701/209 |

* cited by examiner

Primary Examiner—Jack Keith
Assistant Examiner—Ronnie Mancho
(74) Attorney, Agent, or Firm—Brinks Hofer Gilson & Lione (57) ABSTRACT

A Point of Interest (POI) icon display method in a navigation system is described for displaying a POI icon at a POI point on a map. For every POI in a POI category, the location point and type of POI are stored. Each POI is identified on the displayed map by the same POI icon, and when a POI icon of a POI is selected, the type of POI is displayed. Accordingly, it is possible to reduce the number of POI icons, recognize the type of POI, such as the type of food of a restaurant (classified by country, such as Japanese food, Chinese food, Italian food, and French food), and provide a guide route to a desired POI quickly.

19 Claims, 11 Drawing Sheets

| COORDINATES (LONGITUDE, LATITUDE) | POI ICON CODE | BORDERING ROAD NAME | LINK (NODE N1, N2) | CATEGORY | |
|---|---|---|---|---|---|
| $(x_1, y_1)$ | 🍴 | ABC AVE. | ..... | RESTAURANT | BBB RESTAURANT |
| ..... | ..... | ..... | ..... | ..... | ..... |

POI ICON DISPLAY METHOD AND NAVIGATION SYSTEM

BACKGROUND OF THE INVENTION

1. Field of the Invention

The present invention relates to a Point of Interest (POI) icon display method and a navigation system for displaying a POI icon at a POI position on a map, and more particularly, to a POI icon display method and a navigation system for displaying a specified category of POI by the same POI icon among the POIs and enabling a type of the POI in the specified category to be identified.

2. Description of the Related Art

An on-vehicle navigation system detects a vehicle position and reads out map data for the area around the vehicle position from a map storage medium such as a CD-ROM or a DVD. Thereafter, a map and a guide route are drawn on a display picture plane (display screen), and a vehicle position mark is overlapped and drawn on a predetermined position on the map. In accordance with the change of the present position due to the movement of the vehicle, the vehicle position mark on the picture plane is moved along a guide route. Alternatively, the vehicle position mark is fixed at a predetermined position and the map is scrolled so that a user can understand a detailed map around the vehicle position with a single glance.

The navigation system includes a function for displaying icons (POI icons) indicative of different categories of POIs, such as an ATM (Automatic Teller Machine), bank, gas station, restaurant, hotel, car park, etc. on a map. Some POI categories can be further differentiated by type within the category. For example, there are various types of restaurant POIs. As a result, inconveniently, it is difficult to discriminate the type of food in a restaurant, namely, the type of food classified by country such as Japanese food, Chinese food, Italian food, and French food. It has been considered to use a different POI icon corresponding to each type of food. However, the number of icon types is increased and it may be difficult to have the POI icon correspond to the type of food.

Figure 11:
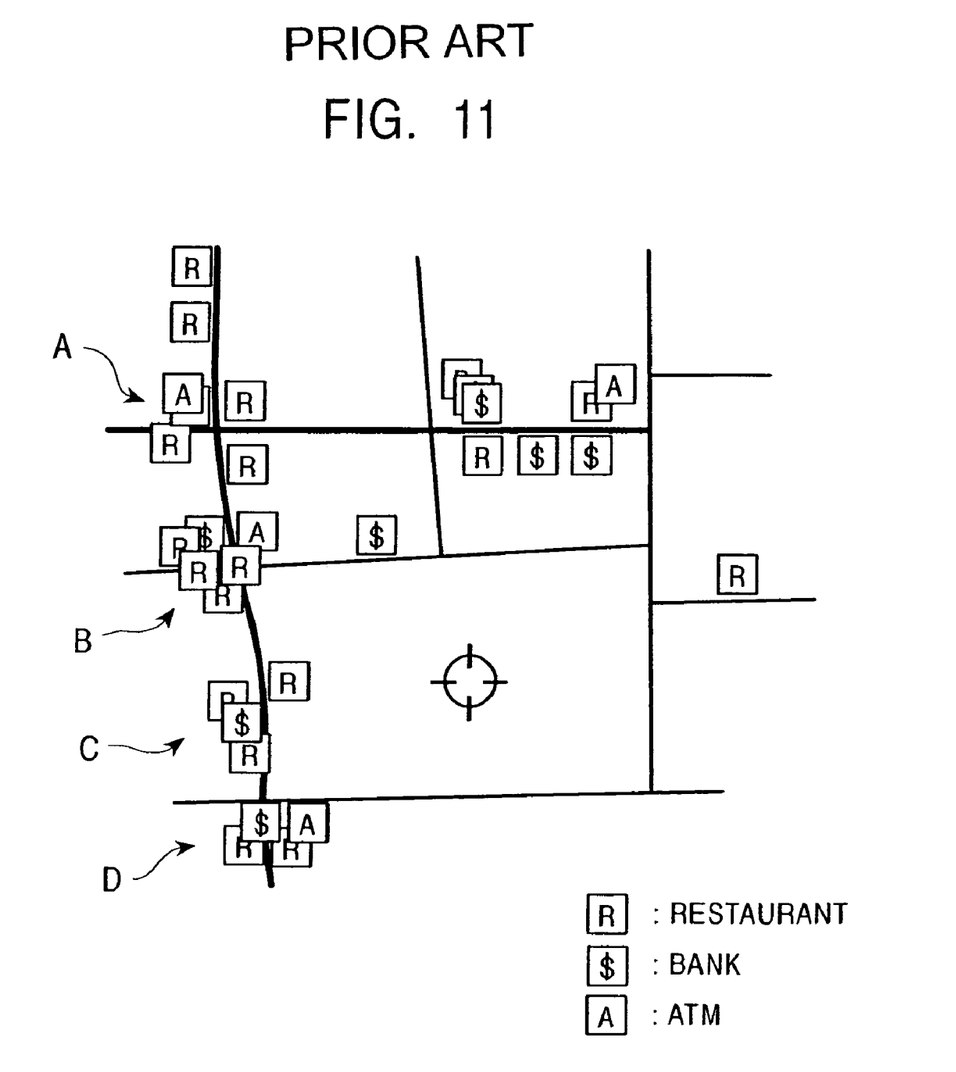
FIG. 11 is an illustrative display in a conventional system.

A road may be congested with the POI icons in a display of a downtown area, as shown by A, B, C, and D in FIG. 11. Moreover, if a wide area view is employed, and the icon size displayed remains the same, icon density increases, and the road is further congested with a larger number of POI icons. In this situation, if moving a cross cursor onto the road in order to confirm a road name and an address on the map or to set a destination on the road, it is difficult to avoid selecting a POI icon and this prevents a road or a point on a road from being selected. Therefore, a problem arises that the user cannot confirm the road name and address or the setting of the destination, and the road name and the address must be confirmed and the destination must be set only after executing a complicated operation to erase the icons through a set-up menu.

The number of POI icons displayed on the map is increased in a downtown area, and a plurality of the same POI icons may be included within a cursor of a predetermined size. In such a case, a problem arises to make it difficult to input a point and select a road correctly.

SUMMARY OF THE INVENTION

It is a first object of the present invention to enable the user to easily recognize the type of POI in a particular category (POI), when using POI icons in the category commonly, and thus to select a desired POI and search a route to the POI.

It is a second object of the present invention to display only POIs of a desired type by a POI icon. Thus, the number of POI icons displayed is decreased and the user can select the desired POI easily.

It is a third object of the present invention to enable a road or a point on a road to be selected easily if the road is congested with POI icons. Thus, it is possible to confirm a road name and an address or set a destination on a road.

It is a forth object of the present invention to make it easy to comprehend the displayed situation when using a cursor with a predetermined size and possible to input a point and select a road correctly.

According to the present invention, to attain the first object, (1) a point where a POI is located and the type of POI are stored for every POI in a category, (2) the POIs are displayed on a map by the same POI icon, (3) when selecting the POI icon of a predetermined POI, the type of the POI is displayed on the map by a POI icon.

According to the present invention, to attain the second object, (1) a point where a POI is located and the type of POI are stored for every POI in a category, (2) the type of a POI displayed on a map by a POI icon is preset, (3) the POI with the set type is displayed on the map by the same POI icon, and (4) when selecting the POI icon of a predetermined POI, the type of the POI is displayed.

According to the present invention, to attain the third object, (1) an index for selecting a cursor instructing point is displayed as well as a POI name (such as a restaurant name, bank name, and hotel name) of at least one POI icon, which is selected by a cursor with a predetermined size, and (2) a predetermined POI name or index is selected and the POI icon or cursor instructing point is selected.

According to the present invention, to attain the forth object, (1) a map is scrolled by an operation for moving a cursor, and (2) when a plurality of the same POI icons are included within the cursor, only one POI icon is displayed and the others are erased.

Other features and advantages of the present invention will be apparent from the following description taken in conjunction with the accompanying drawings.

Figure 1A:
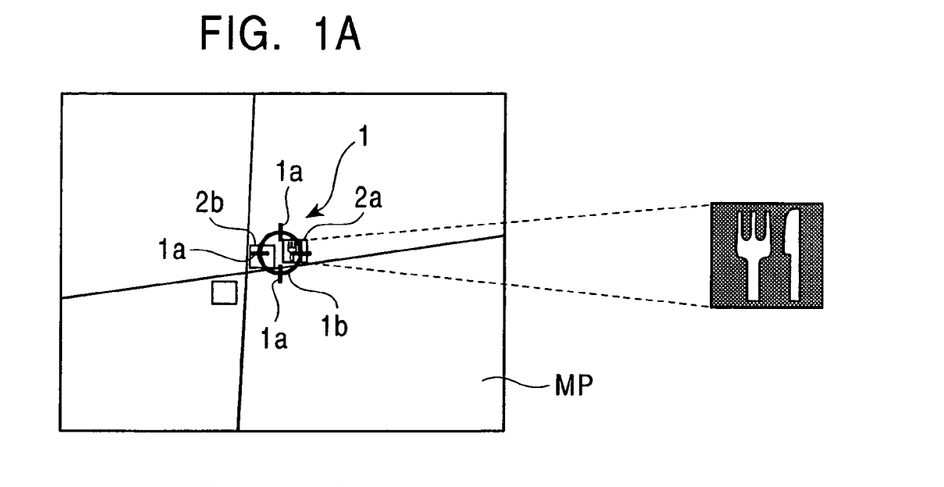
FIGS. 1(A) to 1(C) are first schematic illustrative diagrams according to the present invention.
Figure 1B:
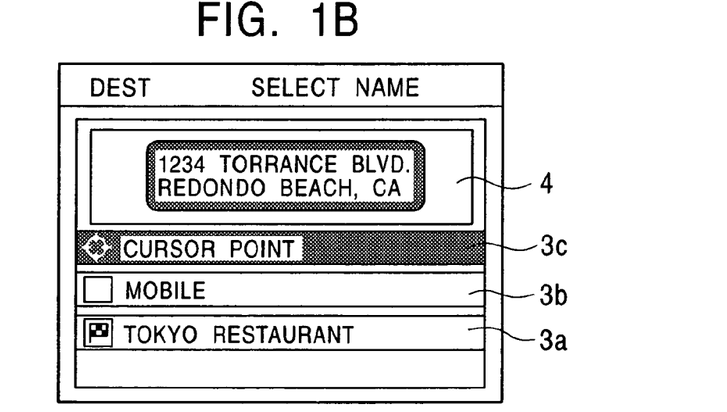
Figure 1C:
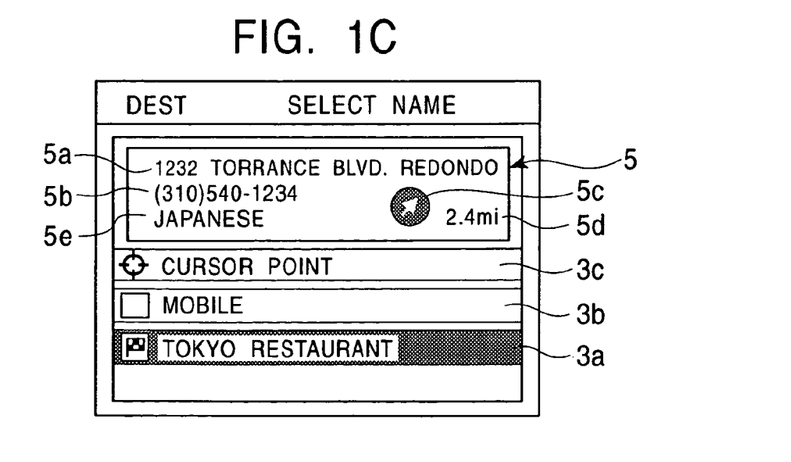

DETAILED DESCRIPTION OF THE INVENTION (A) Outline of the Present Invention (a) Display of Type of POI FIGS. 1(A) to 1(C) are first schematic illustrative diagrams of the present invention. Although the invention is applicable generally to POI categories that can be further differentiated by type within the category, the invention will be described using the example of restaurants, which can be differentiated by type of food. Other examples include stores, which can be differentiated by type of goods, automobile dealers, which can be differentiated by type of auto, and so on.

According to the present invention, a location position and a type of food (classified by a country such as Japanese food, Chinese food, Italian food, and French food) are preset for every restaurant. The restaurants are displayed on a map by the same POI icon. For example, as shown in FIG. 1(A), the restaurants are displayed by the same POI icon having symbols such as a fork and a knife.

When desiring to have a meal in a Japanese restaurant, the user scrolls a map MP by an operation for moving a circular cursor 1 (in FIG. 1(A)) with a cross form, a POI icon 2a of the restaurant is displayed on a display screen, and the POI icon is selected by the cursor 1. After that, if an enter key is operated (not shown), the system operates as shown in FIG. 1(B):

(1) POI names (TOKYO RESTAURANT and MOBILE) 3a and 3b of the POI icons 2a and 2b identified by a circular portion 1b in the cursor 1 are displayed;
(2) an index "Cursor Point" 3c for selecting a point (cross intersection) selected by a cross 1a of the cursor 1 is displayed;
(3) an address 4 of the point is displayed on a display screen, and
(4) the index 3c and the address 4 are displayed in highlight, or displayed reversely.

In this state, if selecting the POI name (TOKYO RESTAURANT) 3a by a highlight point shift key (not shown), the system displays detailed information 5 about the TOKYO RESTAURANT, as shown in FIG. 1(C) i.e., an address 5a, telephone number 5b, direction 5c, distance 5d, and type of food (Japanese: Japanese food) 5e). Therefore, the user can recognize that the restaurant indicated by the POI icon 2a is a restaurant with Japanese food. When the user depresses the enter key and sets the restaurant as a destination, the system searches and provides a guide route from the present point to the restaurant. Note that in the case of returning to the display in FIG. 1(B) from that in FIG. 1(C), the index "Cursor Point" 3c may be selected by the highlight point shift key.

As mentioned above, if the POI icon of the restaurant is common, the user can recognize the type of food in the restaurant easily, and select a desired restaurant and search a guide route to the restaurant.

By presetting the types of food (such as a French restaurant and an Italian restaurant) in the restaurants displayed on the map by use of the POI icon, only the restaurants of the preset types of food are displayed on the map by the same POI icon. As a result of this operation, the displayed number of POI icons can be reduced and the restaurants of the desired French food and Italian food can be selected easily.

(b) Selection of Road

When using the cursor to select a point on a road congested with the POI icons the cross intersection of the cursor causes the road to be selected on the POI icon. Thereafter, if the enter key is depressed, the system displays the same information as that in FIG. 1(B). Incidentally, a road name is displayed in place of the address of the point. Where the index "Cursor Point" is selected, if depressing the enter key and setting the cursor instructing point as a destination, the system searches the guide route from the present point to the cursor instructing point and executes route guidance.

Thus, if the road is congested with the POI icons (refer to A to D in FIG. 11), the system is able to confirm the road name and address and set the destination easily.

Figure 2A:
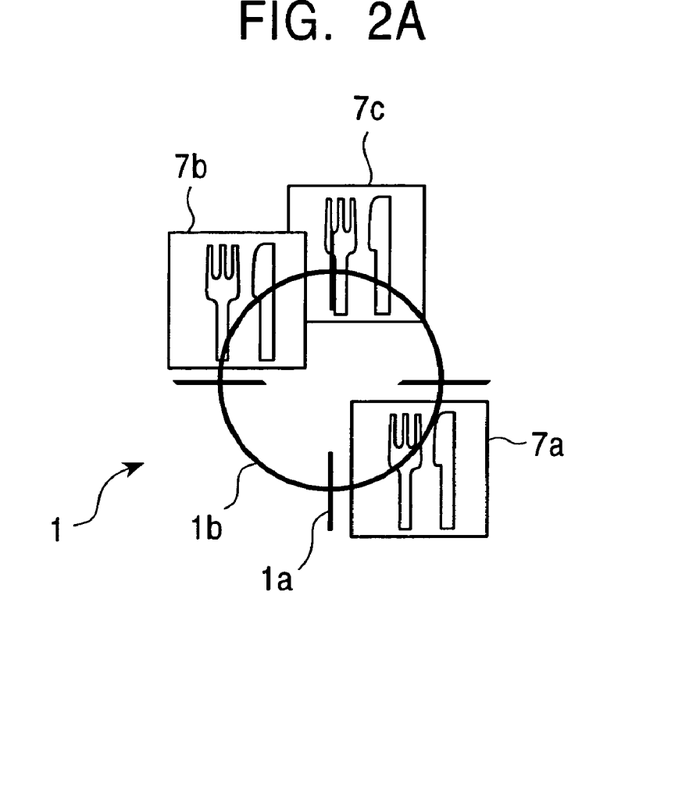
FIGS. 2(A) and 2(B) are second schematic illustrative diagrams according to the present invention.
Figure 2B:
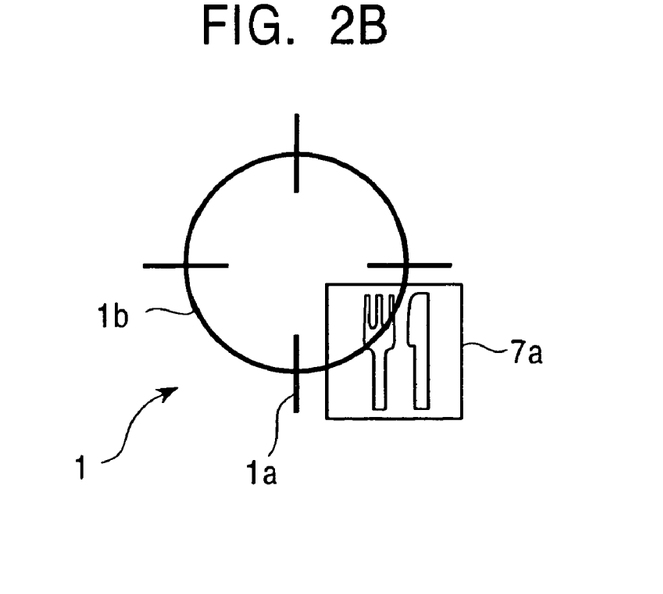

When a plurality of the same POI icons 7a, 7b, and 7c are included within the cursor 1 as shown in FIG. 2(A), only one POI icon 7a is displayed and the other POI icons 7b and 7c are erased, as shown in FIG. 2(B). Consequently, it is easy to see the situation in the cursor with a predetermined size, and it is possible to select the point and road correctly by the cross intersection.

(B) Construction of Navigation System

Figure 3:
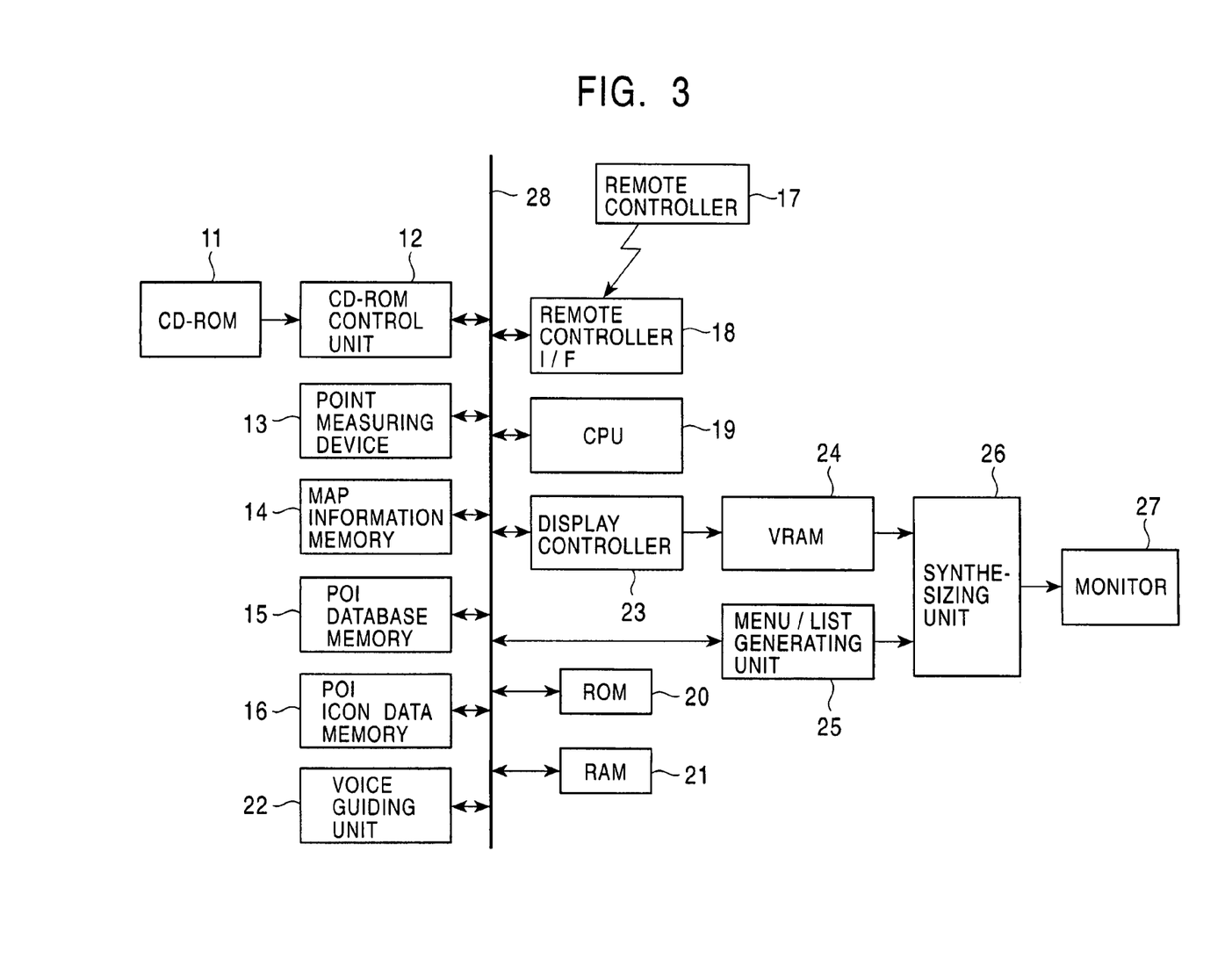
FIG. 3 is a block diagram of a navigation system according to the present invention.

FIG. 3 is a block diagram of a navigation system according to the present invention. In the figure, reference numeral 11 denotes a map storage medium for storing a map, e.g., a CD-ROM; 12 a CD-ROM control unit for controlling an operation to read map information from the CD-ROM; 13 a point measuring device for measuring the present vehicle position, which has a vehicle speed sensor for detecting a moving distance, a gyro for detecting a moving direction, a CPU for calculating a position, a GPS receiver, etc.; 14 a map information memory for storing the map information which is read out from the CD-ROM; 15 a POI database memory for storing POI database information which is read out from the CD-ROM; and 16 a POI icon data memory for storing POI icon data.

Figure 4:
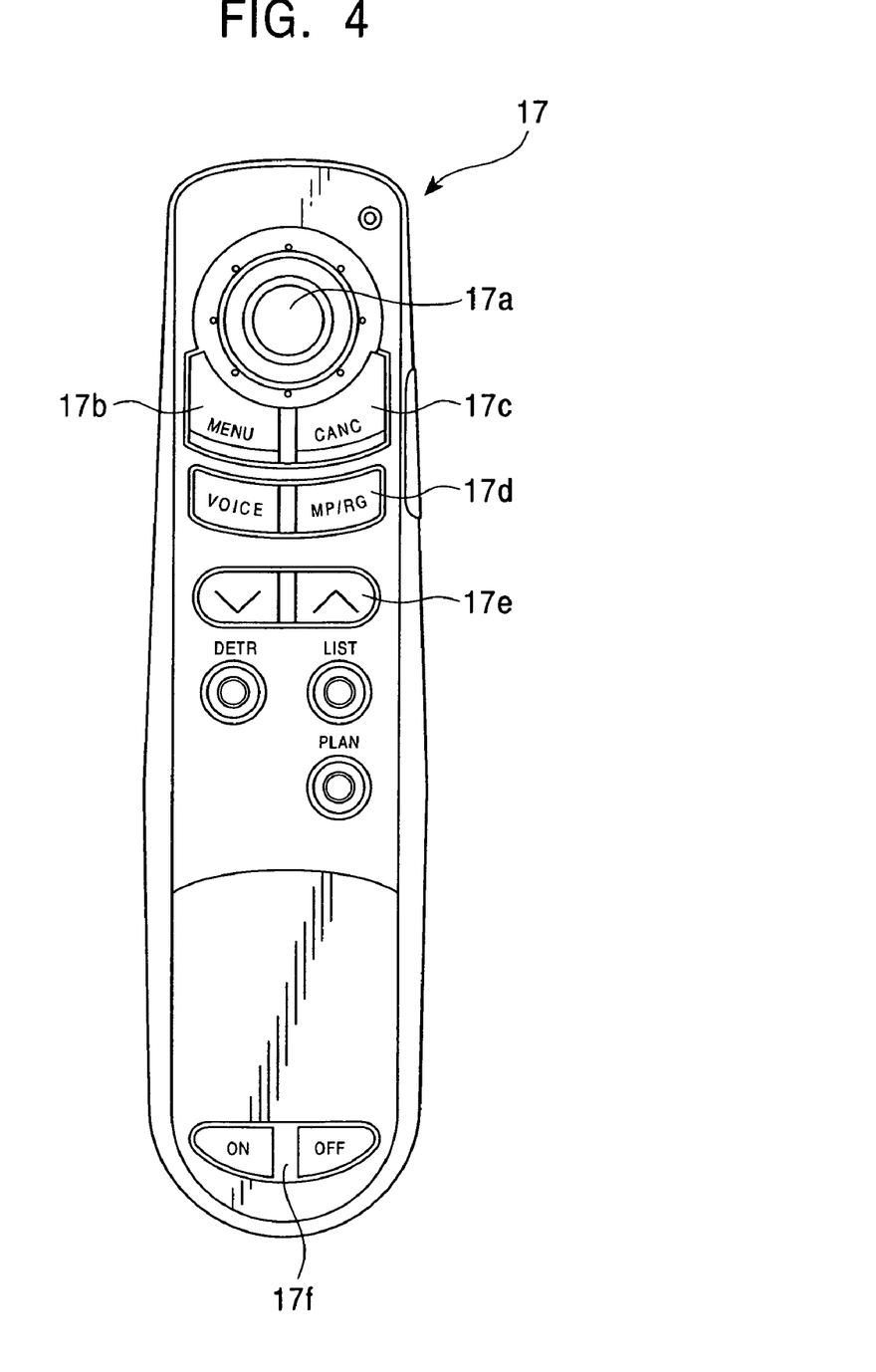
FIG. 4 is an illustrative diagram of a remote controller.

Reference numeral 17 denotes a remote controller for executing a menu selection operation, an enlarging/reducing operation, a destination input operation, etc.; and 18 a remote controller interface. As shown in FIG. 4, the remote controller 17 includes a joystick/enter key 17a; a menu key 17b; a cancel key 17c; an MP/RG key 17d; a zoom/scroll key 17e; a monitor ON/OFF key 17f; and so on. The joystick/enter key 17a has a function as a joystick key for moving the cursor or vehicle mark, etc., relatively in one of eight directions in the map or moving a menu bar (highlight point) when selecting a desired menu index, and a function as an enter key for setting and inputting the cursor point and selecting and inputting the menu. Therefore, the joystick/enter key 17a will be also labeled simply as a joystick key or enter key hereinafter.

The menu key 17b is operated when displaying a main menu, and the cancel key 17c cancels the present displayed screen or is operated when returning the screen to an initial screen of the menu. The MP/RG key 17d is operated when switching guiding modes (MAP GUIDE MODE and ARROW MODE), and when enlarging/reducing the map and vertically shifting the highlight point in various lists.

Referring to FIG. 3 again, reference numeral 19 denotes a processor (CPU) for controlling the entire operation of the navigation system; 20 a ROM for storing various control programs such as a route search program and a map matching program necessary for navigation control; 21 a RAM for storing a processing result such as a guide route; 22 a voice guiding unit for guiding a traveling direction at a crossroad; 23 a display controller for generating map images (a MAP GUIDE image and an ARROW GUIDE image) on the basis of map information; 24 a VRAM for storing the images generated by the display controller; 25 a menu/list generating unit for generating menu image/various list images; 26 a synthesizing unit; 27 a monitor device; and 28 a bus.

(B) Map Information

Figure 5:
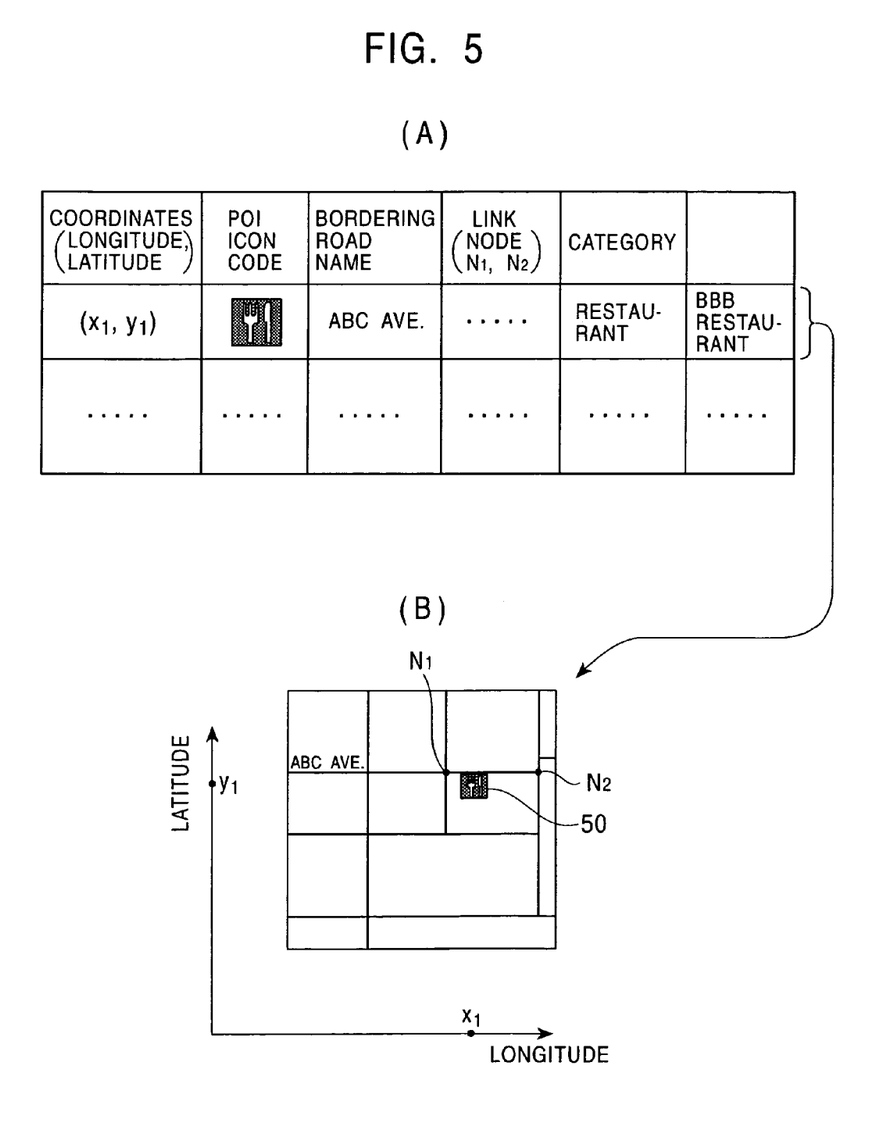
FIGS. 5(A) and 5(B) are illustrative diagrams of a POI icon layer.

The map information comprises: (1) a road layer; (2) a background layer for displaying an object on a map; (3) a character layer for displaying characters such as the names of cities; and (4) a POI icon layer for displaying a POI icon at the location point of a POI properly. The POI icon layer holds the POI icon data shown in FIG. 5(A) for every POI icon. The POI icon data has:

(1) a point based on longitude and latitude for the POI (point indicating the POI icon);
(2) a POI icon code;
(3) a road name which the POI borders;
(4) a link configuration node of a road link where the POI exists;
(5) a POI category (restaurant, hotel, bank, etc.) and;
(6) a POI name.

An example in FIG. 5(A) illustrates a POI icon 50 at a location position (shown in FIG. 5(B)) of a BBB restaurant on the map, along ABC AVE.

(C) POI Database

Figure 6:
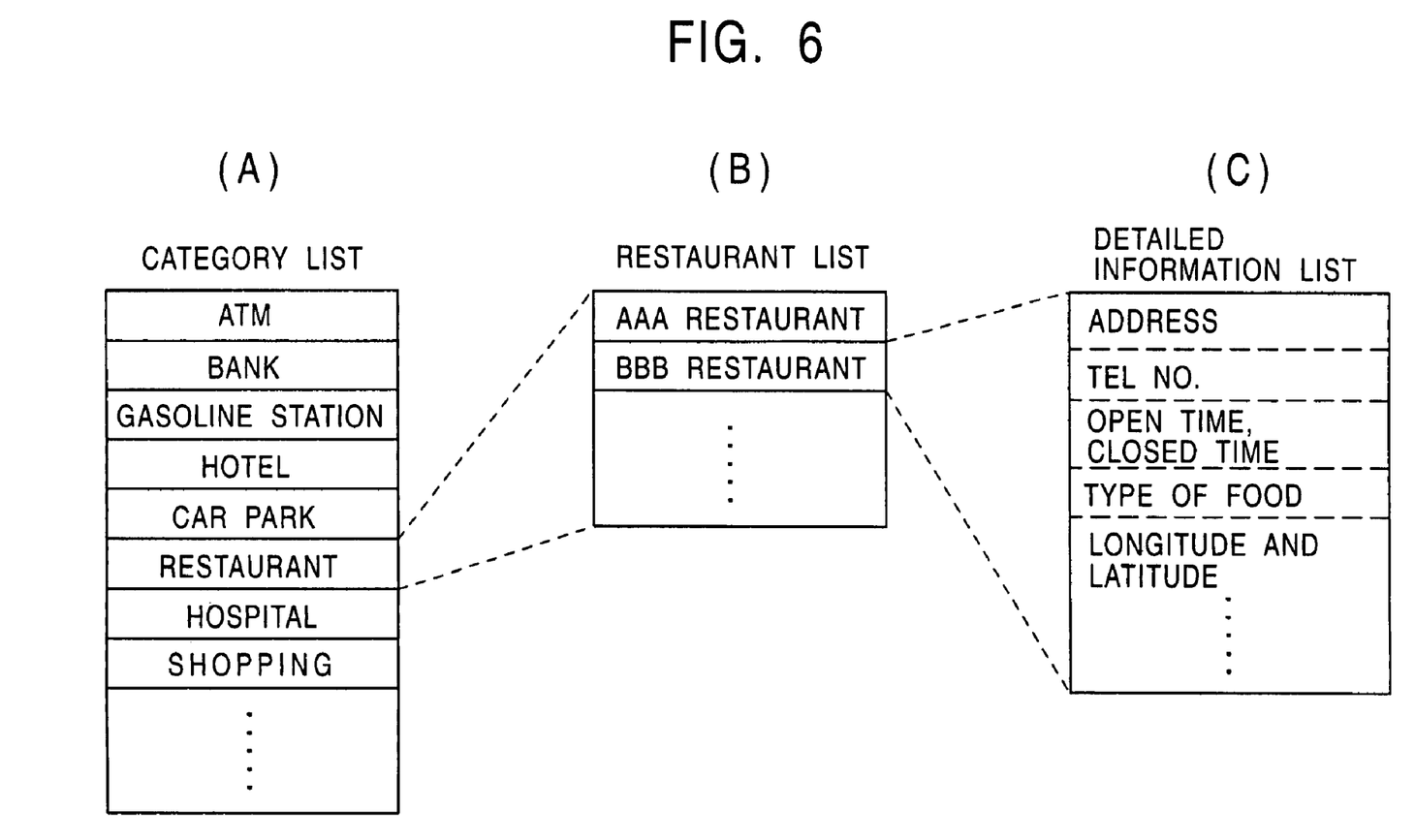
FIGS. 6(A) to 6(C) are illustrative diagrams of a POI database.

The POI database memory 15 stores a large number of POIs corresponding to various categories, plus an address, telephone number, location point indicated by the longitude and latitude of the POI, information peculiar to the POI, etc. FIG. 6(A) shows a POI category list; FIG. 6(B) shows a POI list of restaurants as one category; and FIG. 6(C) shows a detailed information list for BBB restaurant, which contains an address, a telephone number, open/closed time, type of food (namely, a type classified by country such as Japanese food, Chinese food, Italian food, and French food), longitude and latitude, and the like.

(D) First Embodiment

Figure 7:
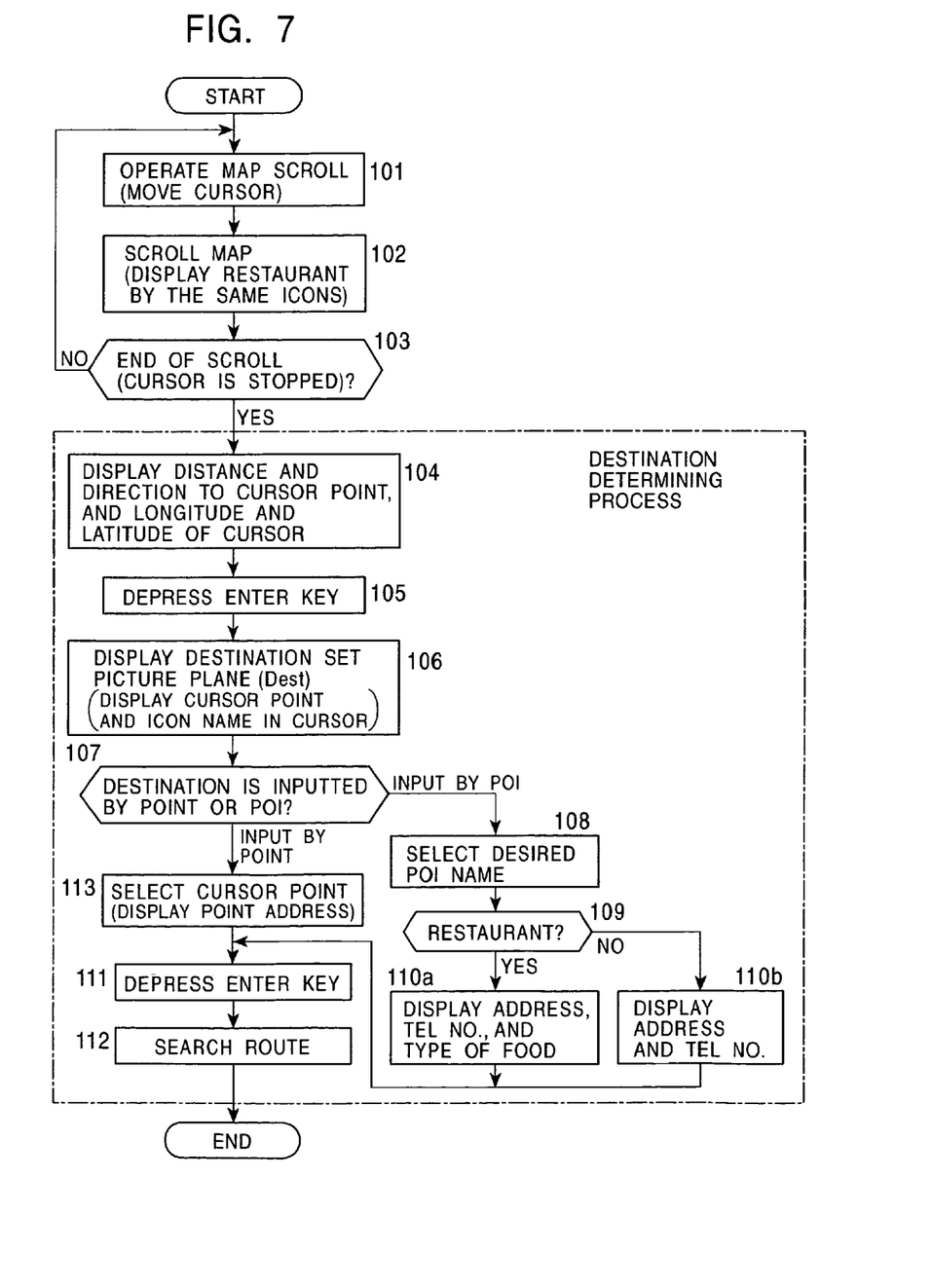
FIG. 7 is a flowchart for a process according to a first embodiment of the present invention.

FIG. 7 is a flowchart of a process for scrolling a map and setting a destination by a cursor according to a first embodiment of the invention; and FIGS. 8(A) to 8(G) are examples of display screens for the first embodiment.

Figure 8:
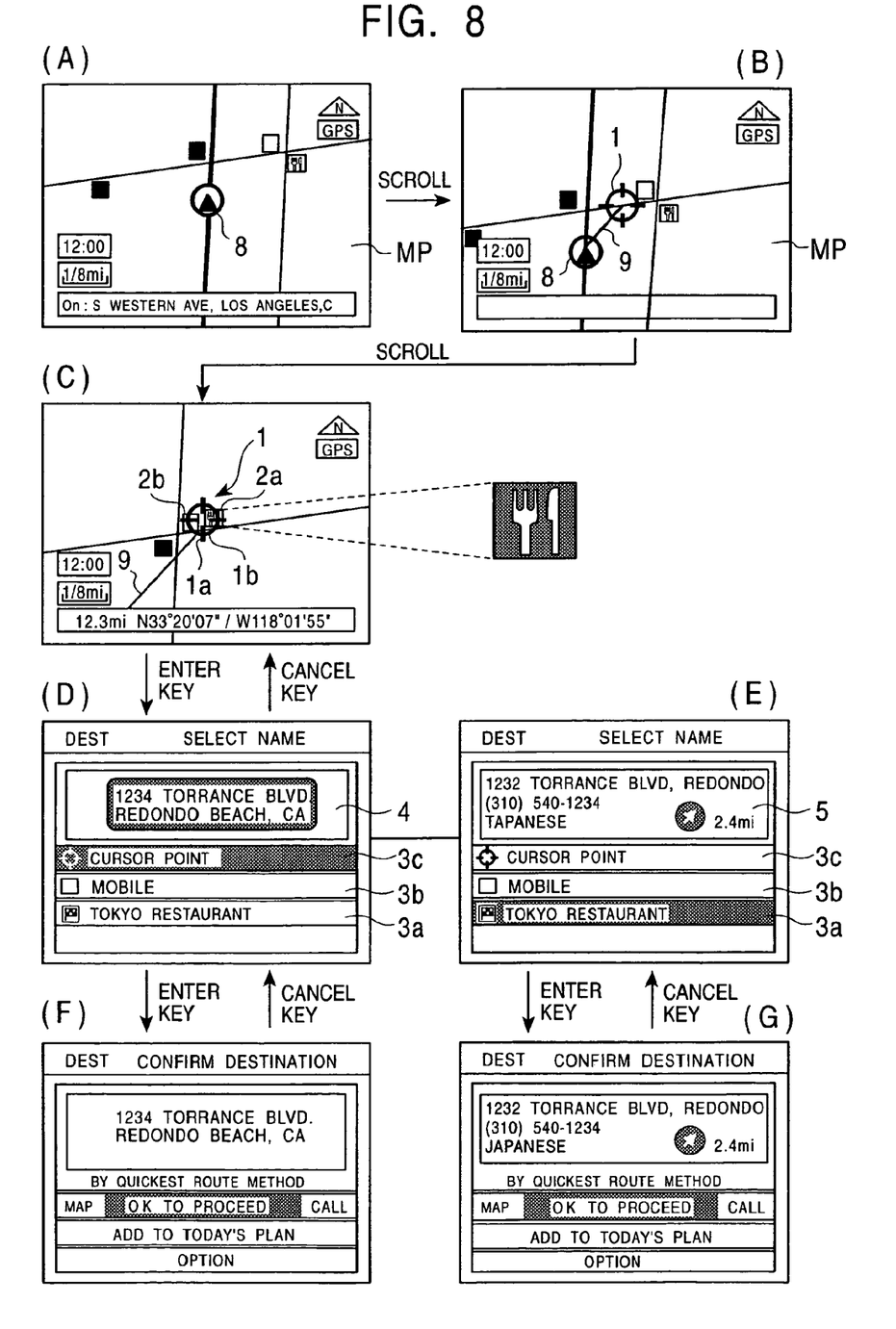
FIGS. 8(A) to 8(G) are display examples according to the first embodiment.

Referring to an initial picture plane or display screen in FIG. 8(A), the joystick key 17a (FIG. 4) is operated (step 101), and the system displays the cursor 1 on the map MP as shown in FIG. 8(B) where the cursor 1 is connected to a vehicle location mark 8 by a directional line 9. Thereafter, the scrolling operation is continued and the map is scrolled (steps 101 and 102). In this case, a restaurant is displayed by the same POI icon, for instance, a POI icon with symbols such as a fork and a knife.

Based on the map scroll, if the cursor 1 identifies a predetermined POI icon or a predetermined point, the scroll operation ends (step 103). At the end of the scroll operation, as shown in FIG. 8(C), the system displays the longitude and latitude of the point identified by a cross intersection of the cursor 1, a distance (12.3 mile) from the location of the vehicle to this point, and the direction 9 of the point identified by the cursor 1 relative to the vehicle location (step 104).

The enter key 17a is depressed (step 105), and then the system displays a destination set picture plane (Dest: Select Name) shown in FIG. 8(D) (step 106). The destination set picture plane displays:

(1) the POI names (TOKYO RESTAURANT and MOBILE) 3a and 3b of the POI icons 2a and 2b indicated by the circular portion 1b in the cursor 1;
(2) the index "Cursor Point" 3c for selecting a point (cross intersection) indicated by a cross 1a in the cursor 1; and
(3) the address 4 of the point, and
(4) the index 3c and the address 4 are displayed in highlight or displayed reversely.

In this state, it is determined whether the destination is inputby the point or by the POI icon (step 107). If it is determined that the destination is inputby the POI icon, a desired POI name is displayed in highlight and selected by use of the zoom/scroll key 17e (step 108).

If selecting the desired POI name, the system checks to see if the selected POI name is a restaurant (step 109). When the restaurant, i.e., the TOKYO RESTAURANT 3a is selected, the system obtains the detailed information about the TOKYO RESTAURANT from the POI database memory 15 and displays the detailed information 5, as shown in FIG. 8(E) (step 110a). The detailed information 5 includes: an address (1232 TORRANCE . . . ); a telephone number (310-540-1234); a directional arrow; a distance (2.4 miles); and a type of food (Japanese). Based on the detailed information, the user recognizes that the TOKYO restaurant indicated by the POI icon 2a is a restaurant having Japanese food.

If the Japanese restaurant is acceptable, the user depresses the enter key 17a (step 111). By depressing the enter key, the system displays a destination confirming picture plane (Dest: Confirmation Destination) shown in FIG. 8(G). When the destination is not changed and is acceptable as it is in the destination confirming picture plane, the user depresses the enter key 17a and the system conducts a search a routine, setting the TOKYO RESTAURANT as the destination (step 112).

If the destination is not acceptable and is to be changed in the destination confirming picture plane, the cancel key 17c (FIG. 4) is depressed. Based on the depression of the cancel key, the system displays the destination set picture plane shown in FIG. 8(E). After that, another POI name is selected by the zoom/scroll key 17e, or the cancel key is further depressed and the picture plane is returned to the map scroll picture plane shown in FIG. 8(C), thereby allowing the user to select a desired destination.

Note that when selecting the POI name (MOBILE) 3b other than the restaurant in step 109, the system obtains the detailed information regarding a mobile gasoline station from the POI database memory 15, and displays the address, telephone number, and other information (step 110b). After that, process subsequent to step 111 is performed.

If inputting a destination by a point in step 107, since a destination confirming picture plane (FIG. 8(D)) in which the index "Cursor Point" 3c selected in step 106 has been already displayed, the user depresses the enter key 17a (step 111). Incidentally, if the destination confirming picture plane in FIG. 8(D) is not displayed and another destination confirming picture plane (e.g. FIG. 8(E)) is displayed upon the determination in step 107, the index "Cursor Point" is selected by the zoom/scroll key 17e. The destination confirming picture plane FIG. 8(D) is displayed (step 113), and thereafter the enter key 17a is depressed (step 111).

If setting the cursor instructing point as a destination by depressing the enter key 17a, the system displays the destination confirming picture plane shown in FIG. 8(F). When the destination is not changed and the user depresses the enter key 17a, the system sets the cursor instructing point as a destination and searches a guide route (step 112).

The foregoing shows the case of setting the destination, and the similar processes and operations are also implemented in the case of selecting a point on a road by the cursor when the road is congested with the POI icons (A to D in FIG. 11). That is, when identifying a point on a road, which is congested with the POI icons, by use of the cursor 1 the road is identified onto the POI icon by the cross intersection in the cursor 1. After that, by depressing the enter key 17a, the system displays the same information as that in FIG. 8(D). Incidentally, a road name is displayed instead of the address of the location point. Additionally, the enter key 17a is depressed and the cursor instructing point is set as a destination, and then the system searches a guide route to the cursor instructing point on the map from the present location point, thereby guiding the route.

(E) Second Embodiment

Although the first embodiment shows the case of displaying all of the restaurants on the map by the same icon, if the type of food desired in a restaurant has already been determined, the system is able to display only those restaurants by the POI icon having the desired type of food. For example, restaurants having French food and Italian food can be set for display by the POI icon and only the restaurants with French food and Italian food will be displayed on the map by the POI icon. Thus, it is possible to reduce the number of displayed POI icons and to select a desired restaurant more easily.

Figure 9:
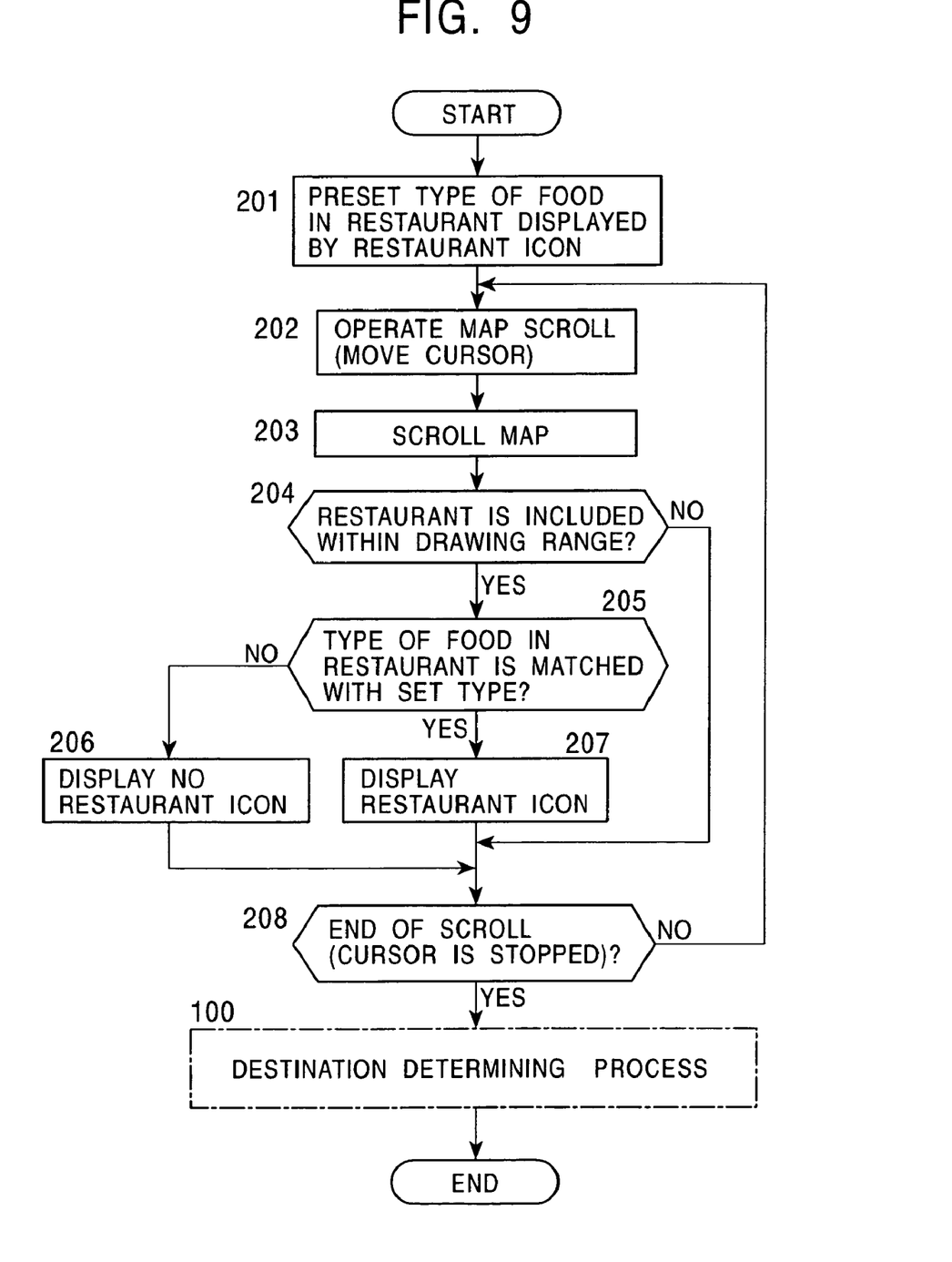
FIG. 9 is a flowchart for a process according to a second embodiment of the present invention.

FIG. 9 is a flowchart of the operation of the second embodiment according to the present invention. A type of food in a restaurant to be displayed by the POI icon is preset (step 201). The type of food is set by displaying a set-up picture plane on the display screen. The joystick key 17a (in FIG. 4) is operated so that i the type of food is set (step 202). The map is scrolled (step 203). Based on the map scroll, it is determined whether a restaurant is included within a drawing range (step 204). If it is determined that a restaurant is included within the drawing range, it is determined whether the type of food in the restaurant matches with the type of food set in step 201 (step 205). If the answer is NO in step 205, the POI icon of the restaurant is not displayed (step 206). If the answer is YES in step 205, the POI icon of the restaurant is displayed (step 207).

The processes in steps 202 to 207 are conducted until the cursor 1 identities a predetermined POI icon or a predetermined point. If the cursor 1 identifies a predetermined POI icon or predetermined point, the scroll operation ends (step 208). Thereafter, the destination determining process 100 as in the first embodiment shown in FIG. 7 is executed.

(F) Third Embodiment

The number of POI icons displayed on the map is greater in a downtown area, etc. and a plurality of the same POI icons can be included within the cursor. In such a case, the problem arises that it is difficult to see the inside of the cursor and select a point correctly or to select a road by the cross intersection. According to this embodiment of the invention if a plurality of the same POI icons are included within the cursor, only one POI icon is displayed and the other icons are erased. Thus, it is easy to see the situation within the cursor with a predetermined size and it is possible to select a point or a road correctly by the cross intersection.

Figure 10:
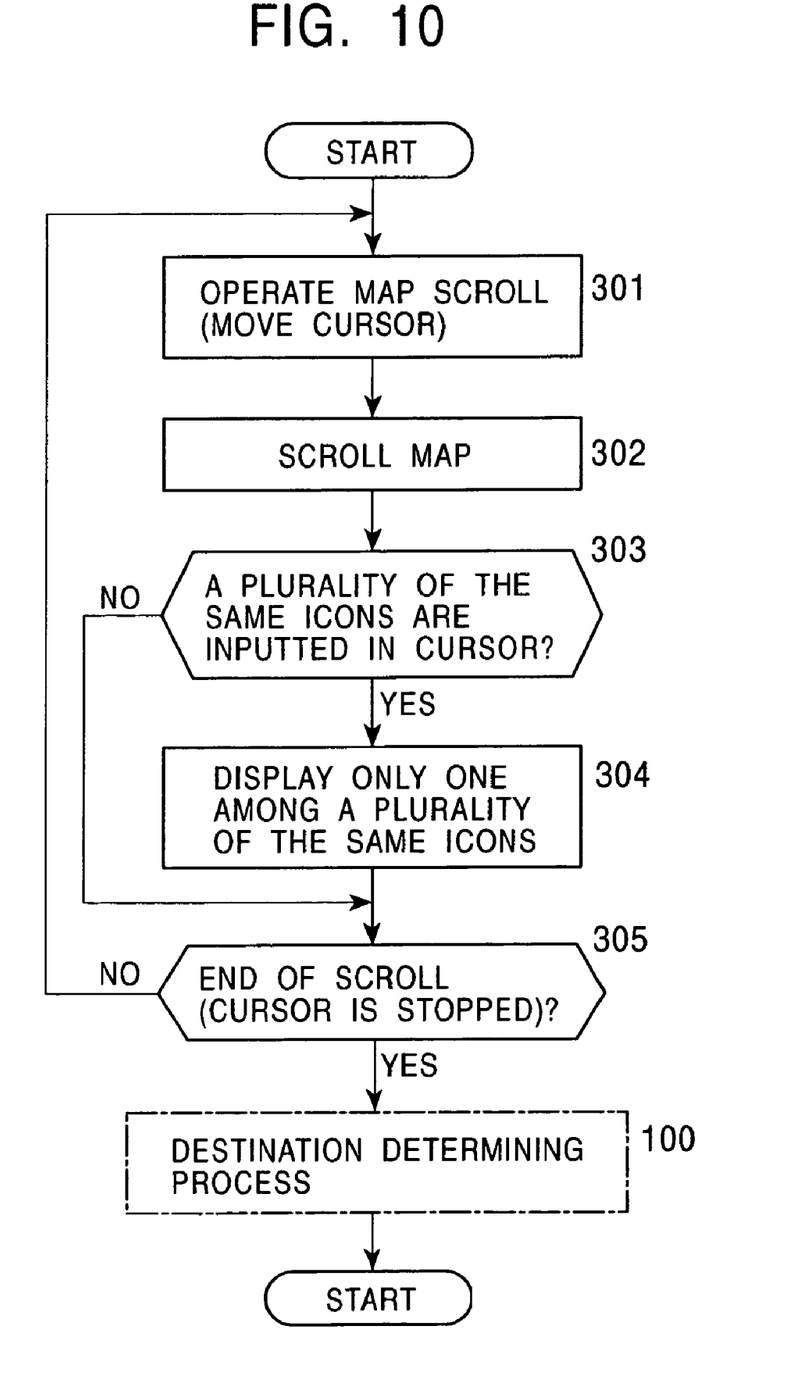
FIG. 10 is a flowchart for a process according to a third embodiment of the present invention.

FIG. 10 is a flowchart of the operation of the third embodiment according to the present invention. The joystick key 17a (in FIG. 4) is operated (step 301), and a map is scrolled (step 302). Based on the map scroll, it is determined whether a plurality of the same POI icons are included within the cursor (step 303). If a plurality of the same POI icons are included within the cursor (refer to FIG. 2(A)), only one POI icon is displayed and the other POI icons are erased (step 304, refer to FIG. 2(B)). After that, the processes in steps 301 to 304 are repeated until the cursor 1 identifies a predetermined POI icon or a predetermined point. If the cursor identifies a predetermined POI icon or predetermined point, the scroll operation ends (step 305). Thereafter, the operation executes the destination determining process 100 as in the first embodiment in FIG. 7.

According to the present invention, if using the POI icon of the restaurant commonly, the user can recognize the type of food in the restaurant easily and therefore can select a desired restaurant as a destination.

According to the present invention, since only a restaurant of a desired type of food is displayed by the POI icon, it is possible to reduce the number of the POI icons displayed on the map, and the user can select a desired restaurant as a destination easily.

According to the present invention, if the road is congested with the POI icons, it is possible to select a road and a point on the road easily. Therefore, it is possible to confirm a road name and an address and set a point on the road as a destination.

According to the present invention, when a plurality of the same POI icons are included within the cursor, only one POI icon is displayed and the other POI icons are erased, so that it is easy to see the situation within the cursor and it is possible to select a point and a road correctly by the cross intersection.

As many apparently widely different embodiments of the present invention can be made without departing from the spirit and scope thereof, it is to be understood that the invention is not limited to the specific embodiments thereof except as defined in the appended claims.

What is claimed is:

1. A method of displaying a POI icon at the location point of a POI on a map displayed by a navigation system, comprising:

defining a plurality of different POI categories, wherein at least some POI categories are further differentiated by type of goods or service within the category;

storing a location point and a type of POI for every POI in each category having different types of POI;

displaying the map image including POIs located on the map, wherein POIs from two or more categories can be displayed on the map at the same time, POIs within each category are displayed on the map by a common POI icon for that category, and the POI icons displayed on the map for different POI categories are different;

moving a cursor relative to the displayed map, the cursor defining both a predetermined area on the map and a cursor point on the map within the predetermined area;

displaying a list including a POI name of at least one POI located in the predetermined area defined by the cursor and a location on the map corresponding to the cursor point;

selecting a POI name or the location corresponding to the cursor point from the list; and for POIs having a stored type, displaying the type of POI within a category when a POI is selected.

2. A method according to claim 1, wherein one POI category is restaurants and said type of POI is type of food classified by country.

3. A method according to claim 1, wherein the map is scrolled by an operation for moving a cursor and the POI icon corresponding to a POI is selected by said cursor.

4. A method according to claim 3, further comprising:

storing a POI name for each POI;

displaying POI names of a plurality of POI icons which are overlapped by the cursor; and selecting the POI icon corresponding to a desired POI by selecting the POI name of said POI among said plurality of POI names.

5. A method according to claim 1, wherein a destination is set after selecting the POI icon, thereby searching a route to the POI corresponding to said POI icon.

6. A method of displaying a POI icon at the location point of a POI on a map displayed by a navigation system, comprising:
defining a plurality of different POI categories, wherein POIs in at least some POI categories are further differentiated by type of goods or service within the category;
storing a location point and a type of POI for every POI in each category having different types of POI;
presetting the type of POI in a selected POI category;
displaying the map image including POIs located on the map, wherein only POIs of said preset type of POI are displayed on the map by a common POI icon for the selected category, and POI icons are displayable on the map at the same time for different POI categories and are different;
moving a cursor relative to the displayed map, the cursor defining both a predetermined area on the map and a cursor point on the map within the predetermined area;
displaying a list including a POI name of at least one POI located in the predetermined area defined by the cursor and a location on the map corresponding to the cursor point;
selecting a POI name or the location corresponding to the cursor point from the list; and
for POIs having a stored type, displaying the type of POI within a category when a POI is selected.

7. A method according to claim 6, wherein one POI category is restaurants and said type of POI is type of food classified by country.

8. A method according to claim 6, wherein the map is scrolled by an operation for moving a cursor and the POI icon corresponding to a POI is selected by said cursor.

9. A method according to claim 8, further comprising:
storing a POI name for each POI;
displaying POI names of a plurality of POI icons which are overlapped by the cursor; and
selecting the POI icon corresponding to a desired POI by selecting the POI name of said POI among said plurality of POI names.

10. A method according to claim 6, wherein a destination is set after selecting the POI icon, thereby searching a route to the POI corresponding to said POI icon.

11. A method of displaying a POI icon at the location point of a POI on a map displayed by a navigation system, comprising:
moving a cursor relative to the displayed map, the cursor defining both a predetermined area on the map and a cursor point on the map within the predetermined area;
displaying a list including a POI name of at least one POI located in the predetermined area defined by the cursor and a location on the map corresponding to the cursor point; and
selecting a POI name or the location corresponding to the cursor point from the list.

12. A method according to claim 11, further comprising:
storing a type of food for every restaurant; and
displaying the type of food in a restaurant, when selecting the POI name corresponding to said restaurant.

13. A method according to claim 12, wherein said type of food is classified by country.

14. A method according to claim 11, wherein the location corresponding to the cursor point is selected and, thereafter, said location is set as a destination, thereby searching a route to said location.

15. A method according to claim 11, wherein a POI name is selected and, thereafter, a destination is set, thereby searching a route to the facility corresponding to said POI.

16. A method of displaying a POI icon at the location point of a POI on a map displayed by a navigation system, comprising:
displaying a POI icon of each POI at a location point on the map;
moving a cursor relative to the map, the cursor indicating a predetermined area; and
displaying only one POI icon and deleting the other POI icons, when a plurality of the same POI icons are included within said predetermined area indicated by the cursor.

17. A navigation system for displaying a Point of Interest (POI) icon at the location point of a POI on a map, comprising:
means for storing a location point and a type of POI for every POI in each of a plurality of different POI categories, wherein POIs in at least some POI categories are further differentiated by type of goods or service within the category;
means for displaying the map image including POIs located on the map, wherein POIs from two or more categories can be displayed on the map at the same time, POIs within each category are displayed on the map by a common POI icon for that category, and the POI icons displayed on the map for different POI categories are different;
means for moving a cursor relative to the displayed map, the cursor defining both a predetermined area on the map and a cursor point on the map within the predetermined area;
means for displaying a list including a POI name of at least one POI located in the predetermined area defined by the cursor and a location on the map corresponding to the cursor point;
means for selecting a POI name or the location corresponding to the cursor point from the list; and
means for displaying the type of POI within a category when a POI is selected, for POIs having a stored type.

18. A navigation system for displaying a Point of Interest (POI) icon at a displayed location point of a POI on a map, comprising:
means for storing a location point and a type of POI for every POI in each of a plurality of different POI categories, wherein POIs in at least some POI categories are further differentiated by type of goods or service within the category;
means for presetting the type of POI in a selected POI category;
means for displaying the map image including POIs located on the map, wherein only POIs of said preset type of POI are displayed on the map by a common POI icon for the selected category, and POI icons are displayable on the map at the same time for different POI categories and are different;
means for moving a cursor relative to the displayed map, the cursor defining a both a predetermined area on the map and a cursor point on the map within the predetermined area;

means for displaying a list including a POI name of at least one POI located in the predetermined area defined by the cursor and a location on the map corresponding to the cursor point;

means for selecting a POI name or the location corresponding to the cursor point from the list; and means for displaying the type of POI within a category when a POI is selected, for POIs having a stored type.

19. A navigation system for displaying a Point of Interest (POI) icon at a displayed location point of a POI on a map, comprising:

means for moving a cursor relative to the displayed map, the cursor defining both a predetermined area on the map and a cursor point on the map within the predetermined area;

means for displaying a list including a POI name of at least one POI located in the predetermined area defined by the cursor and a location on the map corresponding to the cursor point; and means for selecting a POI name or the location corresponding to the cursor point from the list.

* * * * *